(12) United States Patent
Kolpekwar

(10) Patent No.: US 9,058,440 B1
(45) Date of Patent: Jun. 16, 2015

(54) METHOD AND MECHANISM FOR VERIFYING AND SIMULATING POWER AWARE MIXED-SIGNAL ELECTRONIC DESIGNS

(75) Inventor: Abhijeet Kolpekwar, Round Rock, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 1159 days.

(21) Appl. No.: 12/638,493

(22) Filed: Dec. 15, 2009

(51) Int. Cl.
G06F 17/50 (2006.01)
G06G 7/62 (2006.01)
G06G 7/54 (2006.01)

(52) U.S. Cl.
CPC ............ *G06F 17/50* (2013.01); *G06F 17/5036* (2013.01); *G06F 17/5045* (2013.01); *G06F 17/5009* (2013.01)

(58) Field of Classification Search
CPC . G06F 17/50; G06F 17/5009; G06F 17/5036; G06F 17/5045
USPC .......... 703/13, 14, 15, 16, 17, 18, 19
See application file for complete search history.

(56) References Cited

U.S. PATENT DOCUMENTS

| | | | |
|---|---|---|---|
| 7,142,140 B2 * | 11/2006 | Storvik et al. ................ 341/141 | |
| 7,251,795 B2 | 7/2007 | Biswas et al. | |
| 7,523,424 B2 | 4/2009 | Kolpekwar et al. | |
| 7,770,142 B1 | 8/2010 | Shmayovitsh et al. | |
| 7,779,381 B2 | 8/2010 | Chickermane et al. | |
| 7,797,659 B2 | 9/2010 | Chetput et al. | |
| 7,945,885 B2 * | 5/2011 | Hoberman et al. ........... 716/133 | |
| 7,958,475 B2 | 6/2011 | Khan | |
| 7,979,262 B1 * | 7/2011 | Iyengar et al. .................. 703/21 | |
| 7,996,811 B2 * | 8/2011 | Hoberman et al. ........... 716/133 | |
| 8,195,439 B1 * | 6/2012 | Hussain ......................... 703/14 | |
| 8,201,137 B1 * | 6/2012 | Bhushan et al. ............... 716/139 | |
| 8,234,617 B2 | 7/2012 | Chetput et al. | |
| 8,255,191 B1 | 8/2012 | Kolpekwar et al. | |
| 8,296,699 B1 | 10/2012 | Chetput et al. | |
| 2006/0074626 A1 * | 4/2006 | Biswas et al. ..................... 704/8 | |
| 2008/0184181 A1 * | 7/2008 | Chetput et al. ..................... 716/7 | |
| 2011/0083114 A1 * | 4/2011 | Chetput et al. ................ 716/106 | |
| 2011/0161899 A1 | 6/2011 | Ginetti et al. | |
| 2011/0161900 A1 | 6/2011 | Ginetti et al. | |

OTHER PUBLICATIONS

Cary Chin, NPL publication "Synopsys Eclypse Low Power Solution", Dec. 15, 2009.*
SCD Source, NPL publication, "Special technology report, Low power Design", Sep. 2008.*

(Continued)

*Primary Examiner* — Omar Fernandez Rivas
*Assistant Examiner* — Angel Calle
(74) *Attorney, Agent, or Firm* — Vista IP Law Group, LLP

(57) ABSTRACT

Disclosed are methods, systems, and structures for implementing an improved approach for simulating mixed-signal electronic circuits with specialized power management requirements, such as low power designs. Some approaches provide an improved method and system for providing a highly reliable, usable and scalable solution to allow for designers to use their power information files in a mixed-signal simulation and carry the impact of power intents defined on the digital blocks onto the analog blocks without needing any manual changes to models/designs.

29 Claims, 17 Drawing Sheets

(56) References Cited

OTHER PUBLICATIONS

Cadence, "Cadence® Mixed-Signal Circuit Design Environment User Guide", Product Version 5.0, Oct. 2003.*
chhsu, "Mixed Signal IC Design Kit Training Manual", 2003.*
Power forwar, "Faraday: CPF-Based Low Power Design Methodology for Platform-Based SoCs", Sep. 23, 2009.*
John Decker, Power-Aware Verification Spans IC Design Cycle a plan to closure approach helps ensure silicon success, Jun. 12, 2009.*
Simulink, "Simulation and Model based design, Writing S-Functions", Version 6, Sep. 2006.*
Albert Chen, NPL, "Faraday: CPF-based low power design Methodology for platform basec SoCs", Sept 23, 2009 (google).*
Vidya Prabhu, NPL, "Power Aware Design Verification", Dec. 6, 2007(google).*

\* cited by examiner

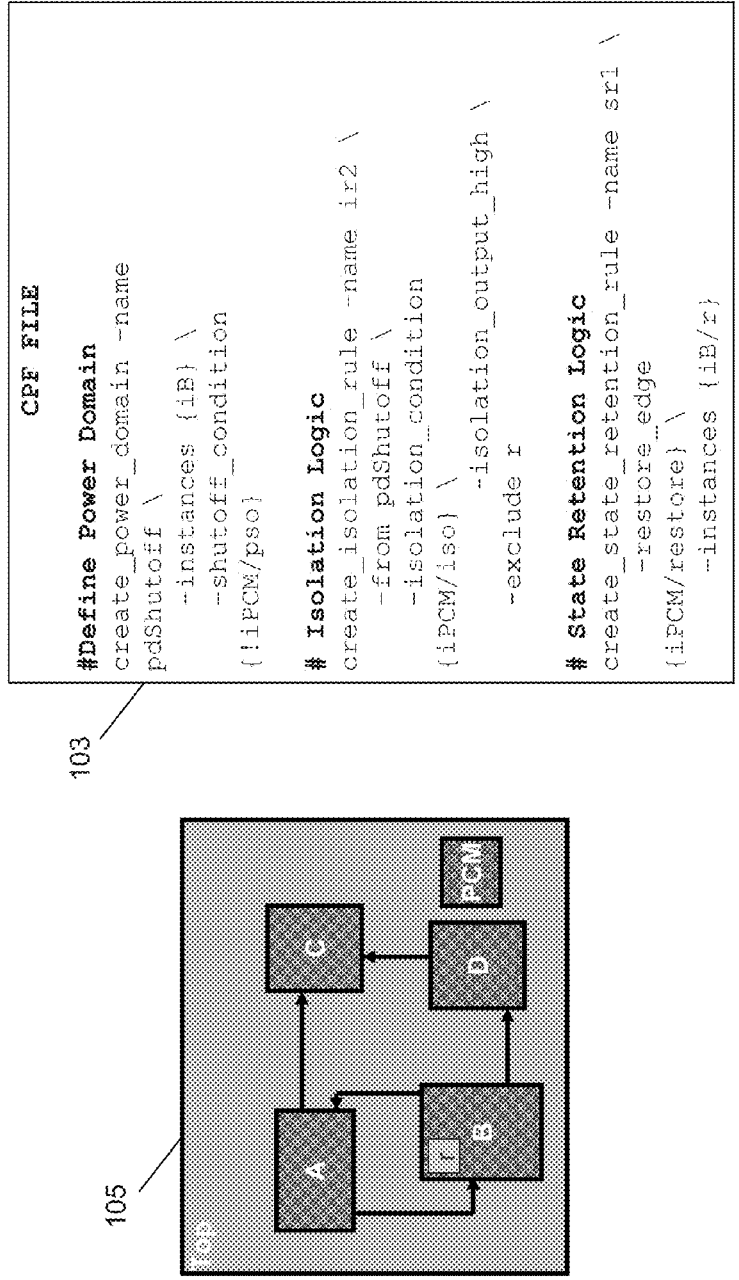

Fig. 2

```
#DEFAULT DOMAIN
create_power_domain -name PD_top -default \
    -active_state_conditions {high@pmc.A}

#DOMAIN FOR INSTANCE "pmc.dut.mux"
create_power_domain -name {PD_mux} \
    -instances {mux} \
    -shutoff_condition (pmc.pso_mux) \
    -secondary_domains {PD_top} \
    -active_state_conditions {high@pmc.A \ low@pmc.B}

#DOMAIN FOR INSTANCE "pmc.dut.add"
create_power_domain -name {PD_add} \
    -instances {add} \
    -shutoff_condition (pmc.pso_add) \
    -secondary_domains {PD_mux} \
    -active_state_conditions {high@pmc.A} update_power_domain -name PD_mux -transition_slope 0.2
update_power_domain -name PD_add -transition_slope 0.2
```

Fig. 3A

```
connectrules myrules;
  connect a2d input electrical, output logic;
Endconnectrules module top
  electrical e;  // Electrical is an analog discipline
  dig_receiver i1(e);// Analog net connected to digital child directly
  alg_driver i2(e);
Endmodule module dig_receiver(d);
  input d;
  logic d;   // logic is a discrete discipline
  logic d1;
  assign d1 = d;
Endmodule module alg_driver(a);
  output a;
  electrical a, g;
  ground g;
  vsource #(.dc(1.00)) v1(a,g);
  resistor #(.r(1.00)) r1(a,g);
Endmodule
```

Fig. 3B

```
connectmodule a2d(ain, dout);
input ain; electrical ain;
output dout; logic dout;
integer i;
assign dout = i;
always begin
    #1;
    if (V(ain) < 2.5)
        i = 0;
    else
        i = 1;
end
endmodule
```

Fig. 3C

```
Module top
  electrical e; // Electrical is an analog discipline
  logic e_dig; // Created by the tool
  dig_receiver i1(e_dig);
  alg_driver i2(e);
  a2d my_inst(e, e_dig); // Auto inserted by the tool
endmodule
```

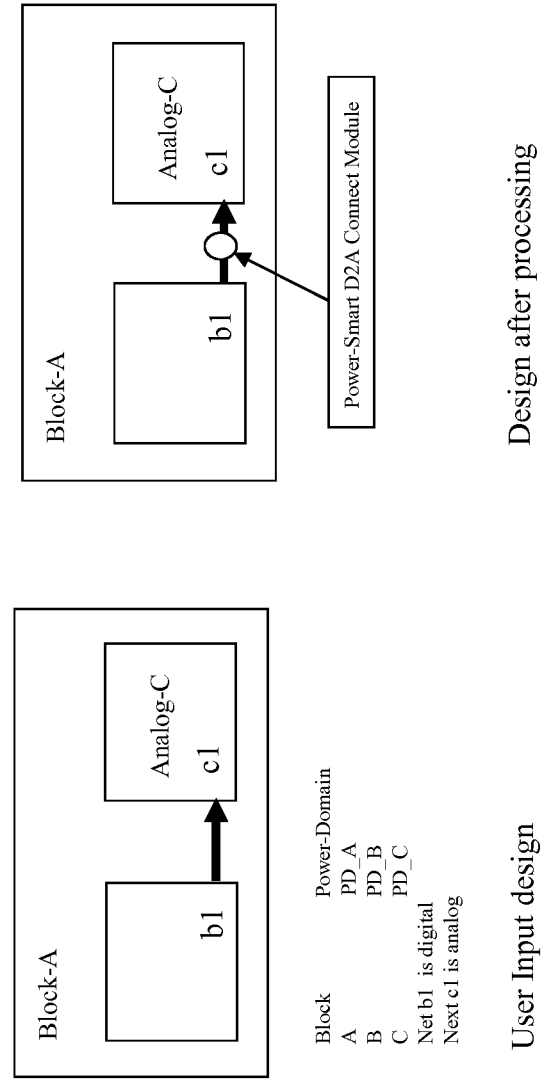

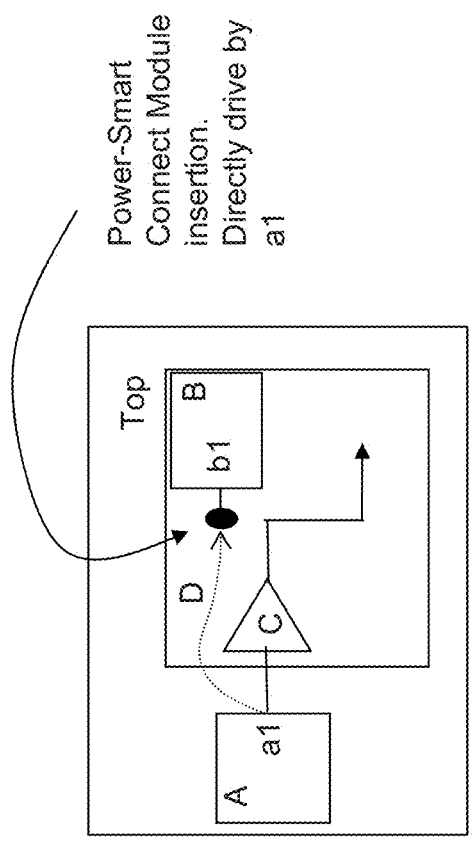

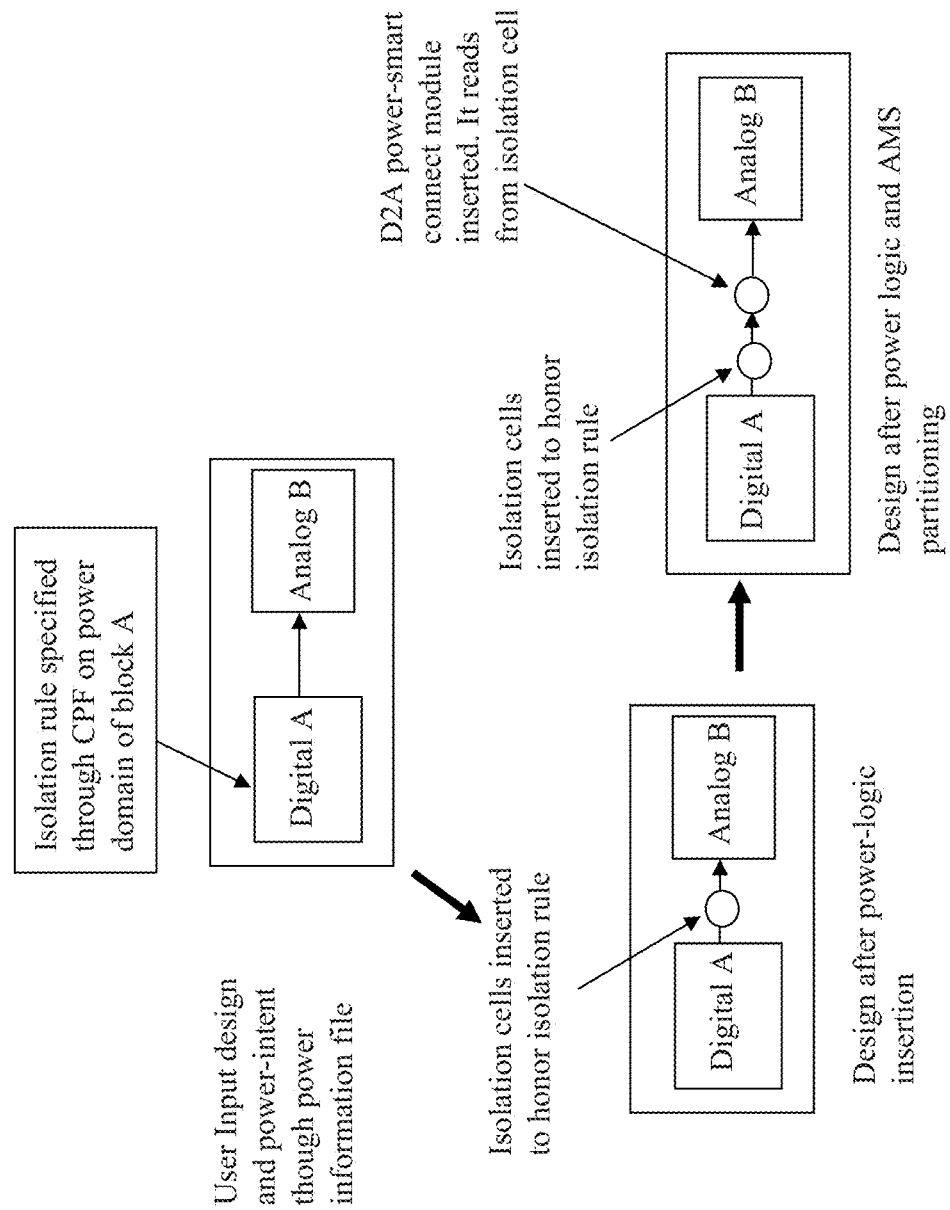

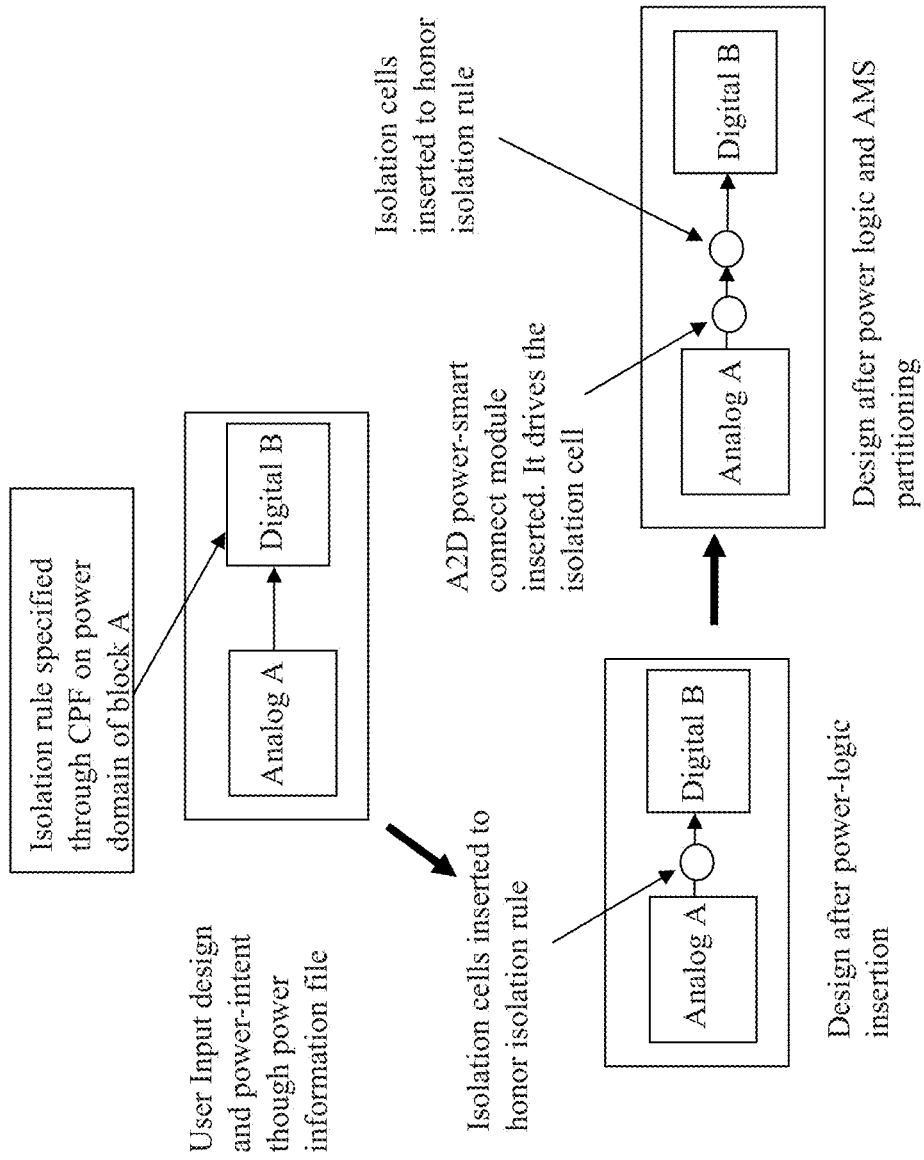

METHOD AND MECHANISM FOR VERIFYING AND SIMULATING POWER AWARE MIXED-SIGNAL ELECTRONIC DESIGNS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The invention relates to technology for designing and verifying an integrated circuit ("IC") design.

With the rapid growth of the wireless and portable electronic markets, there is a constant demand for new technological advancements. This has resulted in more and more functionality being incorporated into battery-operated products, increasing challenges for power management of such devices. Such challenges include minimization of leakage power dissipation, designing efficient packaging and cooling systems for power-hungry IC's, or verification of functionality or power shut-off sequences early in the design. These challenges are expected to become even more difficult with the continuous shrinking of process nodes using today's CMOS technology. Managing design and verification for power will be as critical, if not more than, for timing and area in today's IC design flow for portable consumer electronics.

Modern electronic design is typically performed with computer aided design (CAD) tools or electronic design automation (EDA) systems. To design an integrated circuit, a designer first creates high level behavior descriptions of the IC device using a high-level hardware design language (HDL). Common examples of HDLs include Verilog and VHDL. An EDA system typically receives the high level behavior descriptions of the IC device and translates this high-level design language into netlists of various levels of abstraction. Essentially, the process to implement an electronic device begins with functional design and verification (e.g., using RTL), and then proceeds to physical design and verification.

Older technologies for power optimization and implementation techniques are only leveraged at the physical implementation phase of the design. Certain advanced power management techniques like multiple power domains with power shut-off (PSO) methodology can only be implemented at the physical level (i.e., post synthesis). These advanced power management design techniques significantly change the design intent, yet none of the intended behavior can be captured in the RTL. This creates a large gap in the RTL to GDSII implementation and verification flow where the original RTL is no longer reliable and cannot be used to verify the final netlist implementation containing the advanced power management techniques. In addition, these specialized power management techniques at the physical implementation stage cannot be used by EDA tools at other stages of the design process, and therefore cannot be used by EDA tools at an earlier RTL or gate level stage of the IC design process to perform, for example, functional verification. One reason this is important is because verification of low power designs only at the physical implementation stage of the design process may not capture all potential design flaws within the IC, particularly sequence-related problems for power modes that are ideally tested at the functional stage of the IC design process.

As a result, there is a growing demand from designers to model and optimize the power requirements of a design to help build highly power efficient designs. This has given rise to a variety of low-power techniques that designers can employ on their designs to achieve their power goals.

Recently, techniques have been introduced that allow designers to define their power intents across various design phases. In particular, common power file formats have been introduced which is capable of capturing power-related design intent information, power-related power constraints, and power-related technology information for an integrated circuit. Examples of such common file formats include the Common Power Format (CPF) and the Unified Power Format (UPF). The same power information file is supported by the EDA tools across all the design phases, such as simulation, synthesis, and routing. This allows various design levels to communicate their power intents with each other without having any risk of losing information, e.g., due to file translations. Since all the design teams talk the same power language, this helps to get a common focus on the overall power goals of the design.

The drawback to these approaches is that for simulation, the conventional approaches to implementing common power file formats have focused only on the digital aspects of the design. This causes problems when the designers wish to configure designs to use analog abstractions as well as digital abstractions to gain better accuracy on the blocks and perform analog-mixed-signal (AMS) simulation. The analog blocks require continuous time-domain (analog) simulators to computer their behavior while digital blocks rely on discrete time event driven (digital) simulators. A mixed-signal simulator uses both analog and digital simulation paradigms and performs the required inter-domain communication to simulate the interaction between analog and digital blocks. Such inter-domain communication is a very important component for controlling the accuracy and performance of the mixed-signal simulation. With the ever increasing complexities of System-On-A-Chip designs, mixed-signal simulation has become a very critical aspect of design verification process. The inability to adequately perform such simulation for low power applications is a severe detriment to the modern design process.

Therefore, there is a need for an improved approach for verifying and simulating mixed signal electronic circuits with specialized power requirements, such as low power designs.

SUMMARY

Some embodiments of the present invention provide an improved method and system for providing a highly reliable, usable and scalable solution to allow for designers to use their power information files in a mixed-signal simulation and carry the impact of power intents defined on the digital blocks onto the analog blocks without needing any manual changes to models/designs.

Other and additional objects, features, and advantages of the invention are described in the detailed description, figures, and claims.

BRIEF DESCRIPTION OF DRAWINGS

FIG. 1 illustrates an example of a power information file to define power intent.

FIG. 2 provides an illustration of a power domain.

FIGS. 3A-C provide an illustration of connect module insertion.

FIG. 9 is used to illustrate power sensitivities of power smart connect modules.

FIGS. 10A-C are used to illustrate communications between always-on domains.

FIGS. 11 and 12 illustrate power smart connect modules with isolation cells.

DETAILED DESCRIPTION

Figure 4:
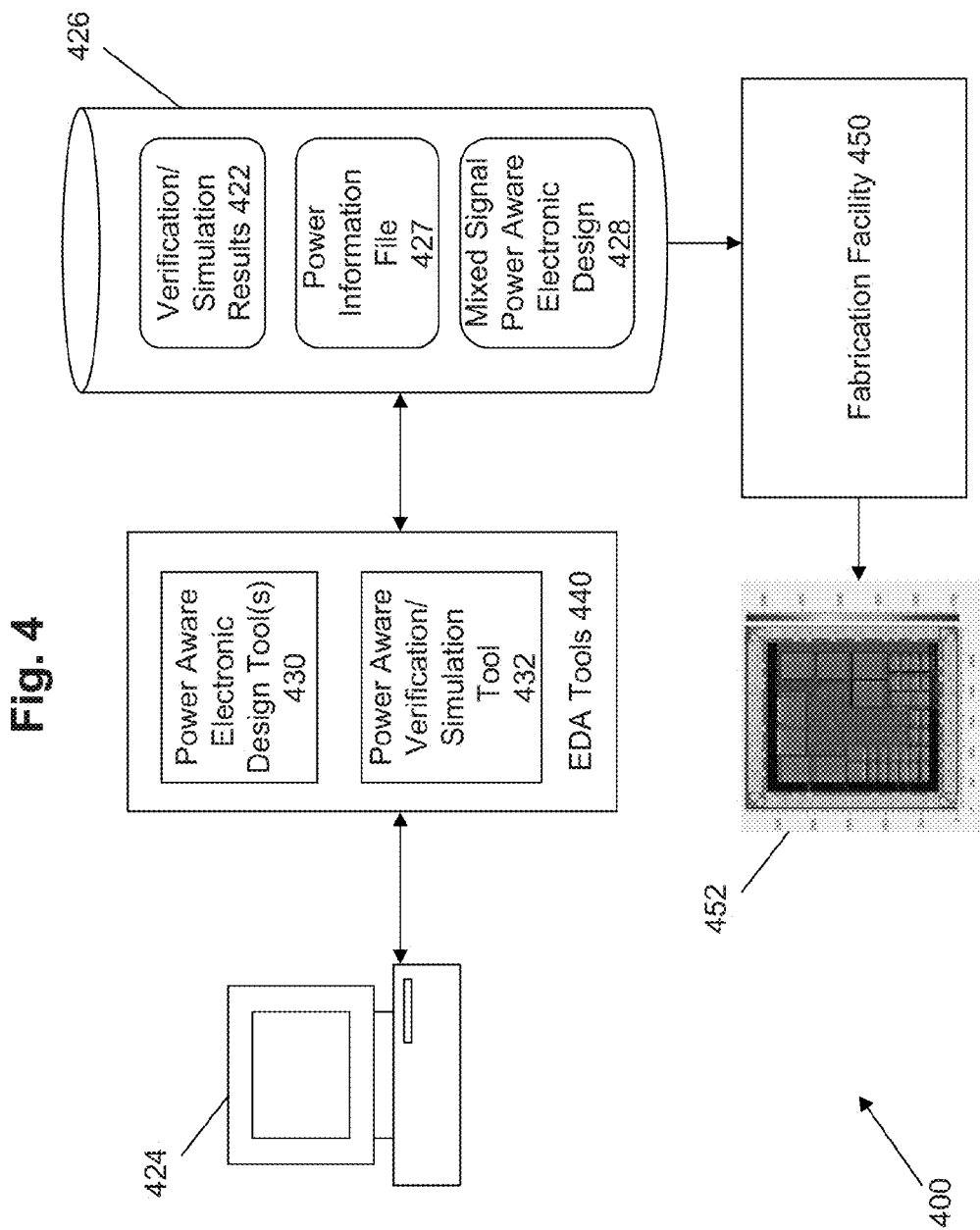
FIG. 4 illustrates an example system in which embodiments of the invention may be implemented.

Some embodiments of the present invention provide an improved method and system for providing a highly reliable, usable and scalable solution to allow for designers to use their power information files in a mixed-signal simulation and carry the impact of power intents defined on the digital blocks onto the analog blocks without needing any manual changes to models/designs.

As noted above, conventional approaches to implementing common power file formats is problematic in that from a simulation point of view, the common power file formats are focused only on the digital aspects of the design. Embodiments of the present invention permits simulation/verification to be performed upon power aware mixed language designs that include both digital and analog portions. According to some embodiments, this capability is implemented using "power smart" interface elements that convert or interface between analog and digital portions of the electronic design, where the interface elements are configured or configurable to work with the power information files. For example, such interface elements may be implemented as Verilog-AMS connect modules that are inserted across digital/analog boundaries using the standard set of protocols defined by the Verilog-AMS specification.

The interface elements/connect modules are responsible for defining and controlling the communication between analog and digital simulators in a mixed-signal simulation process. The power smart interface elements perform inter-domain communication by accounting for the power information obtained from the power information file. According to some embodiments, the power smart interface elements are auto-inserted based on the analog and digital connectivity and requirements. Nominal-voltages are associated with digital blocks to perform D to A conversion. In addition, the analog blocks are shut down if the digital blocks are in a shut-off mode.

It is noted that the present embodiments do not require special set ups, since it can be configured to follow existing use models and HDL semantics. This allows the existing users of mixed-signal simulator to quickly adopt this solution.

For the purposes of illustration, the present description will be described with reference to Verilog-AMS connect modules. The present description will also illustratively provide examples with respect to power information files in the CPF format. It is noted, however, that present invention may be utilized in conjunction with any suitable power format and using interface elements from any suitable design language standard. As a result, it will be clear to one of ordinary skill in the art that the invention is not limited in its scope to the illustrated examples unless claimed as such.

At this point, it is appropriate to provide a brief explanation of certain concepts relating to common power file formats (such as CPF) and AMS (Analog Mixed-Signal) simulation. Common power file formats such as CPF can be implemented as a file that provides information about the power intent that a designer wishes to exercise for an electronic design. This power intent can be read and implemented by the tools in different phases of the EDA design flow.

The common power file format provides power-related information for implementing an electronic design having specialized power requirements. The file format consolidates the appropriate power-related information that is needed to specify power requirements for an electronic design. According to some approaches, the common power file includes power-related information relating to the following categories: (1) design intent information; (2) power constraint information; and/or (3) technology information.

The power-related design intent information is a category of information that identifies the power-related design intent for different portions of the IC design. Different portions of the design having similar intended attributes can be collected together into groupings called "power domains." Each power domain can be individually managed to achieve the power management goals established for that power domain. Examples of such management techniques that can be applied to a power domain include the ability to power up or down a particular power domain as a group or specification of a given voltage level for the design blocks within a power domain. The design intent information may also include different power-related operating characteristics of the design portions within the IC design. For example, there may be many different intended modes of operation for the IC design, with each mode of operation having a different set of power-related characteristics. There may be many variations of operating characteristics for the different power modes. Other types of power constraint information may also be employed within the scope of the invention. For instance, there may be different power-related sequences of operations for the IC design, in which different sequences exist for the different power modes.

The power-related constraint information is a category of information that provides directives to guide optimization and analysis of the IC design. Examples of such power-related constraint information include: (1) dynamic or leakage power constraints, e.g., maximum threshold dynamic or leakage at chip or module levels; (2) IR drop limit constraints, e.g., maximum IR drop limit for a power switch; (3) electromigration (EM) constraints, e.g., maximum EM thresholds; (4) saturation current constraints, e.g., saturation current limits for a power switch; (5) leakage current constraints, e.g., leakage current for a power switch; (6) timing constraints, e.g., elapsed time or cycle time constraints to power up or down or timing constraints for multi-mode and multi-corner analysis (for at least three cases: (i) single mode, single corner; (ii) multi-mode, single corner, (iii) multi-mode, multi-corner).

Power-related technology information generally comprises a library of technology and design blocks to represent specific devices that may be used to implement the IC design. In some approaches, the technology design library includes a library of technology for implementing power-related IC designs.

FIG. 1 illustrates a simple example where power intent 101 is defined for Block B in the design 105 using a CPF file 103. The file 103 shows the shutoff_condition, isolation condition and state retention rule. A, B, C, D and PCM are block names. iA, iB, iC, iD and iPCM are instance names of these blocks. PCM is a power control module that generates power control signals. The shutoff_condition indicates that whenever the signal top.iPCM.pso goes low, the block B (i.e. top.iB) should be shut off. This means that all the signals of block B must be set to "x". The isolation rule indicates that if a signal iPCM.iso is high when the power shutoff is triggered, the output of block B must be isolated to High, i.e. '1', except for register "r". The state retention rule indicates that the state of register top.iB.r should be saved at the power shutoff and restored using the restore signal iPCM.restore. In summary, the power control signals generated from PCM block can control the power behavior of block B and manipulate the signals as indicated in the CPF file 103.

The nominal conditions are defined in the CPF to describe a state power condition. Amongst others, it contains information on the state and voltage value, as used in the following syntax:

create_nominal_condition -name string -voltage float
        [-slate {on |off |standby}] [-ground_voltage float]
        [-pmos_bias_voltage float] [-nmos_bias_volatge float]

The following provides some usage examples for nominal conditions:

create_nominal_condition -name {low} -voltage {1.0} -state {on}
    create_nominal_condition -name {high} -voltage {1.2} -state {on}
    create_nominal_condition -name {off} -voltage {0.0} -state {off}

The "-voltage" portion of these examples describe the voltage values for the nominal conditions. This is important since these voltage values are used when converting from digital to analog values in the power smart connect modules. The "-state" portion identifies state of the nominal condition for the respective power state condition.

A power domain definition can have active state condition associated with it, which can be defined using the following syntax:

create_power_domain . . .
        [-active_state_conditions active_state_condition_list]

An active state condition can be expressed using the following form:

nominal_condition_name@boolean_expression

This command specifies Boolean conditions for a power domain to transition to specific nominal conditions. When an active state condition becomes true, the domain starts to transition to the nominal condition. The delay it takes for the domain to reach its destination nominal condition is determined based on the transitional properties of the domain, which is updated with following command:

update_power_domain -name domain . . .
        [-transition_slope [min:]max |-transition_latency {from_nom latency_list} |-transition_cycles {from_nom cycle_list clock_pin}]

FIG. 2 shows an illustrative example of a power domain with active state condition and delay specification. In this example, the power domains pd_top, pd_mux and pd_add have been declared with a set of active state conditions based on the nominal conditions high and low. Each of the states has a control signal.

An item of information to note about this example is that PD_top is a secondary domain for pd_mux which is a secondary power domain for pd_add. If pd_mux is shut off then it will shut off pd_add. It is also noted that in this example, it is not permitted to allow a nominal condition "off" to shut off a power domain. Therefore, a given power domain can be turned off only using the shutoff condition specified for it or its secondary (base) power domain: (a) pmc.pso_add going high (based on the shut off condition defined in pd_add definition); (b) pmc.pso_mux going high (based on the shut off condition for pd_mux which is a secondary domain for pd_add).

A power mode defines a state of a system or sub-system by enumerating the state of each power domain in the system or sub-system. The power mode is a collection of power domains in a specified active state.

create_power_mode -name string [-default] {-domain_conditions domain_condition_list}

A domain condition specifies a domain in a specific nominal condition with following form:

power_domain@nominal_condition_name

The following are examples of power mode definitions for PM1 and PM2:

create_power_mode -name {PM1} \
        -default \
        -domain_conditions {PD_add@high PD_mux@high}
    create_power_mode -name {PM2} \
        -domain_conditions {PD_add@off\PD_mux@off}

The system or sub-system changes from one mode to another when the power domain transitions from one nominal condition to another. At a higher level of abstraction, power mode transition is described with following mode transition syntax:

create_mode_transition
    -name string
    -from power_mode
    -to power_mode -start_condition expr [-end_condition expr]
    [-cycles [integer:] integer -clock_pin clock_pin |-latency [float:] float]

Using the above example, the following is an illustration of power mode transition specification for PM1 and PM2:

create_mode_transition -name PM1_to_PM2 \
        -from {PM1} \-to {PM2} \
        -start_condition {pmc.sys_off}
    create_mode_transition -name PM2_to_PM1 \
        -from {PM2} \-to {PM1} \
        -start_condition {pmc.sys_on}

A brief background will now be provided on Verilog-AMS connect modules that are used in a mixed-signal simulation. Connect Modules are a well defined concept in the Verilog-AMS language reference manual (LRM) and are used to communicate information between an analog and a digital solver. The connect modules are essentially 2-port verilog-ams modules and are tagged as "connectmodule". The exact connect modules and their location in the design is determined based on a set of rules ("connectrules") and a discipline resolution process. The connectrules are a set of rules that defined by the user to help selection of connection attributes. These rules work on the "disciplines" and port directions of connection. The disciplines are verilog-ams properties that are attached to a net. The disciplines are used to determine the domain (discrete/digital or continuous/analog) of a net. The disciplines can be propagated up and down the hierarchy based on a discipline resolution algorithm specified in Verilog-AMS LRM. When the nets with disciplines of different domains connect to each other, a connect module is inserted based on the rules defined in the connectrules.

FIGS. 3A and 3B provide a high level illustration of connect module insertion in Verilog-AMS semantics. In this example, the "dig_receiver" module represents a completely digital block and the "alg_driver" represents a digital driver block. As noted in the "top" module, the wire "e" is configured as an electrical component, which means that a simulator will attempt to simulate a value for this component. Both the "dig_receiver" and "alg_driver" blocks send/receive onto this wire "e".

The "a2d( )" connect module is employed to provide analog to digital conversion of values from the analog block to the digital block. When an electrical net (input) is driving the logic net (output), the connect module "a2d" is inserted. The connect module a2d is defined in the design that samples an analog value every 1 time unit and converts it to digital 1 or 0 based on whether the analog value is greater than 2.5. This is a very simplistic model for analog to digital conversion. In the design,*an analog net top.e is connected to a digital net top.i1.d. Therefore, a connect module is inserted in the scope of module top.

The resultant module that is simulated appears as shown in FIG. 3C. It is noted that the creation of an internal digital net "top.e_dig" is used to represent digital value of the analog net "top.e". The connect module instance "my_inst" is created to perform the analog to digital conversion. In summary, a verilog-ams design with a combination of connectrules, disciplines, directions information is processed by the simulator to auto-insert the connect modules and make the analog and digital blocks communicate with each other to perform an effective mixed-signal simulation.

With this background, this document will now explain the details of embodiments of the invention. FIG. 4 illustrates an example system 400 which may be employed in some embodiments of the invention for simulating power aware electronic designs. System 400 may include one or more users at one or more user stations 424 that operate the system 400. Such users include, for example, design, test, or verification engineers. User station 424 comprises any type of computing station that may be used to operate, interface with, or implement EDA applications or devices. Examples of such user stations 424 include for example, workstations, personal computers, or remote computing terminals. User station 424 comprises a display device, such as a display monitor, for displaying processing results 422 to users at the user station 424. User station 424 also comprises input devices for user to provide operational control over the activities of system 400.

EDA tools 440 may be used by users at user station 424 to design and verify/simulate a mixed-signal power aware electronic design 428. A power aware electronic design 428 is a design that is associated with power information, e.g., using a power information file 427 in the CPF format. The mixed-signal power aware electronic design 428 is a design that includes both digital and analog portions that interact with each other, e.g., using the semantics of Verilog-AMS.

One or more power aware electronic design tools 430 are employed to generate the mixed-signal power aware electronic design 428. As noted above, many modern IC designs have special power requirements that are important for the proper operation of the IC's final electronic product. For example, consider a mobile or cellular telephone product. Such products are designed for portable use, and hence any ICs that are intended for use in cellular telephones may need to be designed with special power management requirements to prolong battery life. Therefore, ICs that are intended for mobile products such as cellular telephones are often designed with low power requirements and specifications. The power information file 427 provides power design information with respect to the mixed-signal power aware electronic design 428 which captures, for example, power-related design intent information, power-related power constraints, and power-related technology information. Further details regarding example approaches to generate a power aware electronic design 428 and power information file 427 are described in U.S. patent application Ser. No. 11/590,657, now U.S. Pat. No. 7,739,629, which is hereby incorporated by reference in its entirety.

A computer readable storage device 426 may be used to hold the power aware electronic design 428 and power information file 427. The computer readable storage device 426 comprises any combination of hardware and software that allows for ready access to the data that is located at the computer readable storage device 426. For example, computer readable storage device 426 could be implemented as computer memory operatively managed by an operating system. The computer readable storage device 426 could also be implemented as an electronic database system having storage on persistent and/or non-persistent storage.

The electronic design 428 is utilized by a fabrication facility 450 to manufacture electronic products, such as an IC product 452. In particular, the electronic design 428 is used to generate one or more mask which are used in an opto-lithography process by fabrication facility 450 to lithographically create the layers of shapes and materials that form IC 452.

Prior to manufacturing by the fabrication facility 450, an important step in the electronic design process is to verify that the mixed-signal power aware electronic design 428 is correctly implemented and that it will operate as intended. One approach for performing such verification is to perform simulation upon the design 428. As shown in FIG. 4, a power aware simulator 432 is used to simulate the mixed signal power aware electronic design 428 using techniques that take into account the power information that exists for the design 428 in the power information file 427.

Conventionally, simulators working with power aware electronic designs are only able to operate with digital abstractions. As a result, conventional approaches are unable to adequately handle simulation of mixed-signal power aware electronic designs 428. Embodiments of the present invention provide approaches for implementing a power aware simulation tool 432 that can handle mixed-signal power aware electronic designs 428.

Figure 5:
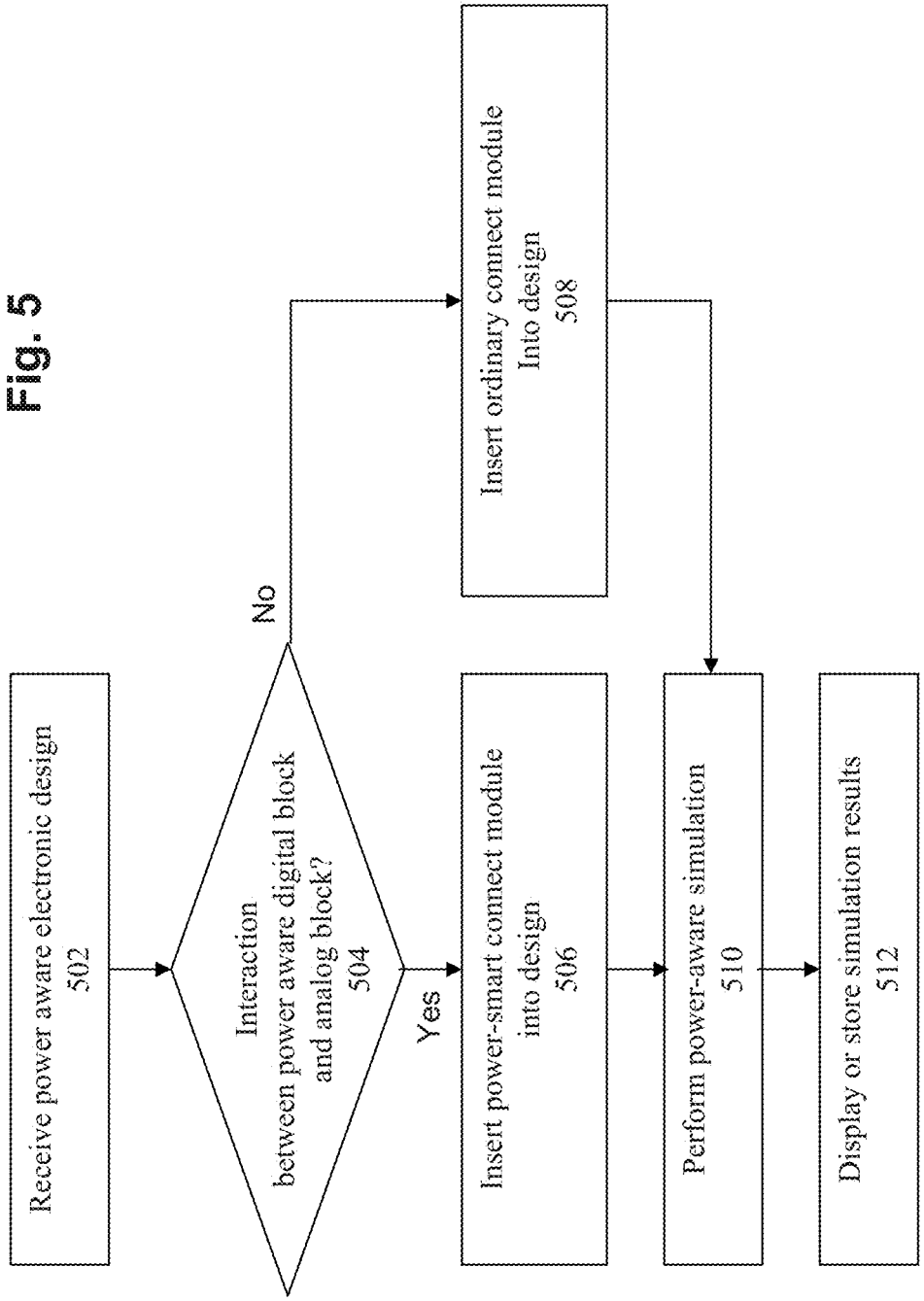
FIG. 5 shows a flowchart of a process for performing power aware simulation for mixed signal designs.

FIG. 5 shows a flowchart of a process for performing simulation according to some embodiments of the invention. At 502, a power aware electronic design is received for simulation. The power aware electronic design is a design that is associated with specialized power information, e.g., in a power information file.

At 504, a determination is made whether there are any interactions between a power aware digital block and an analog block. As used herein for the current embodiment, an analog block/net refers to a block/net that is to be simulated by a continuous time-domain analog simulator. A digital block/net refers to a block/net that is to be simulated by discrete time, event driven digital simulator. The determination of 504 can be performed by checking whether an analog block either drives or is driven by a digital block that is associated with a power information file.

If the interaction is between an ordinary digital block (i.e., a non-power aware digital block) and an analog block, then at 508, a conventional Verilog-AMS connect module is inserted into the design between the digital block and the analog block. The conventional connect module performs the typical functions of converting digital signals into electrical values for D2A (digital-to-analog) connect modules and from electrical values to digital signals for A2D (analog-to-digital) connect modules.

If, however, there is an interaction between a power aware digital block and an analog block, then at 506, a "power smart" connect module is inserted into the design between the power aware digital block and the analog block. The power smart connect modules are connect modules that are configured to perform analog-digital conversions based on the power-state of the digital blocks. The power-state of the digital block is the result of the power-intent defined on the digital block. For power smart analog-digital communications, the following are some power-aspects of the digital block which are considered by the power smart connect module: (1) state of the power domain of the digital block (e.g. off, on, stand-by); (2) the nominal condition associated with the power-state; and (3) the voltages associated with the nominal conditions of the power-domain.

At 510, power aware simulation is performed for the electronic design by using the power smart connect modules during the simulation process. As described in more detail below, the power smart connect modules take into account the power states of the digital blocks when performing A2D or D2A operations for the simulation. Once the simulation is complete, the simulation results can, at 512, be displayed on a display device or stored in a computer readable medium.

Figure 6:
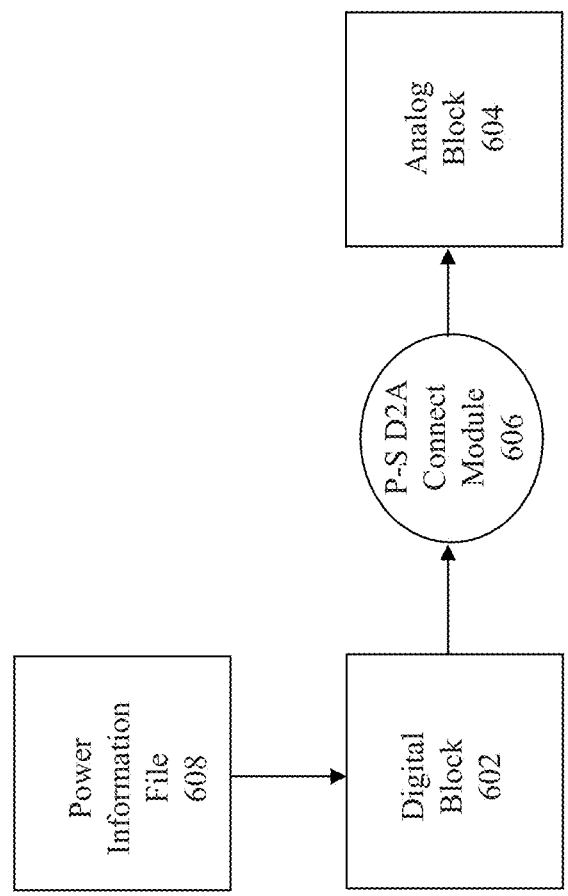
FIG. 6 illustrates insertion of a power aware D2A connect module.

FIG. 6 illustrates insertion of a power smart D2A connect module into an electronic design. In particular, this example shows a power aware digital block 602 that drives an analog block 604. The digital block 602 is power aware since it is associated with a power information file 608 that specifies power-related details and functionality of the digital block 602.

According to the present embodiment of the invention, the power smart D2A connect module operates by back-tracing a digital net driving the power smart connect module to collect a list of its digital drivers and their corresponding power-domains. This operation is performed to generate a list of power-domains that can influence the digital signal driving the power smart D2A connect module.

An ordinary D2A connect module is triggered whenever there is a change in the driving digital signal. However, a power smart connect module is triggered when there is a change in the digital signal or in the state of the power domain associated with that signal changes. This is an important feature since the effect of power state changes are communicated from the digital block to the analog block even when there is no change in the signal values in the digital blocks.

The user can model the behavior of the power smart connect module to use these voltage/bias values as they desire. For example, if a digital value of "1'b1" is seen by the power smart connect module, then it can be translated to analog using the VDD value of the associated nominal condition of the power-state. The power smart connect module also provides access to the other bias voltages associated with the power state of the digital domain, e.g., using the bias voltage values defined as described above. Such biasing information can be used to accurately model the effects of power transitions in the analog block.

According to some embodiments, the power smart connect modules are capable of performing analysis of digital signal corruption due to power-shutoff. For example, if a digital signal has a value "1'bx", then the power smart connect module back-traces the digital signal to its power domains to query the state of the power domains. If the power-domains are shutoff and there is no "off" nominal condition associated with it (i.e., there is no voltage available associated with "off" power-state"), then power smart connect module translates the digital 1'bx value on the analog side, e.g., using a VPSO or "Voltage for Power Shut Off" parameter. Note that VPSO or "off" voltage translation is not performed if the digital value 1'bx did not result from a power-shutoff. Thus, the power smart connect module can distinguish between a signal corruption due to power-shutoff and a signal corruption due to a functional glitch.

Figure 7:
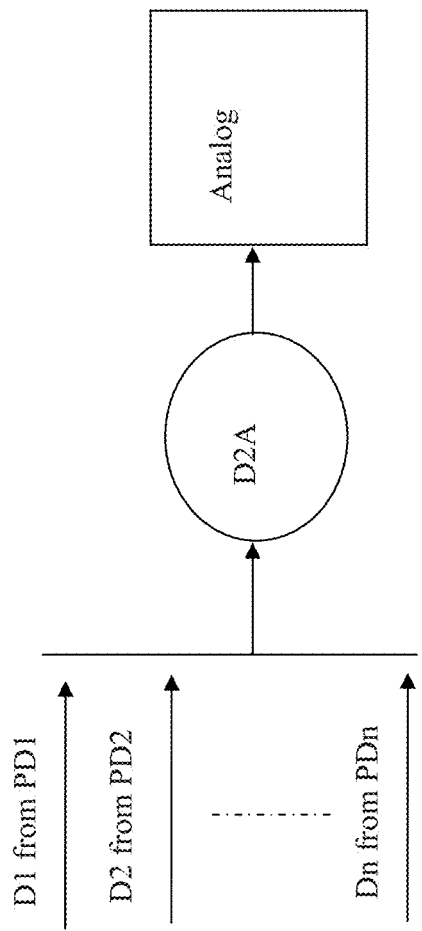
FIG. 7 illustrates a single power aware connect module driven by multiple digital drivers.

As shown in FIG. 7, a single power smart connect module can be driven by multiple digital drivers. Such digital drivers can belong to different power domains. In this case, there is an additional consideration required in selecting the power-domain and the associated nominal conditions for D2A translation.

The figure shows multiple drivers D1, D2, . . . Dn from power domains PD1, PD2 . . . PDn which all drive a power smart D2A connect module. According to one embodiment, the selection criteria operate by checking which of the drivers are in an "on" state. In the present embodiment, it is an error to have more than one power domain in an ON state unless there is a tri-state net and the there is only one driver enabled at a time or there a WAND or a WOR net, in which case it is acceptable to have more than one PDs in the ON state as long as they are using the same nominal condition. It is also an error to have more than one PD in stand-by state or to have more than one PD in ON or stand-by state.

When exactly one driver is in an ON power domain and none are in stand-by, then the nominal condition of the ON power domain is used. When there is exactly one PD in stand-by mode and none is ON, then the nominal condition of the stand-by PD is used. If all of the PDs are in the shut-off state, then the embodiment selects the nominal condition with the lowest shut-off VDD voltage and reports a warning.

Figure 8:
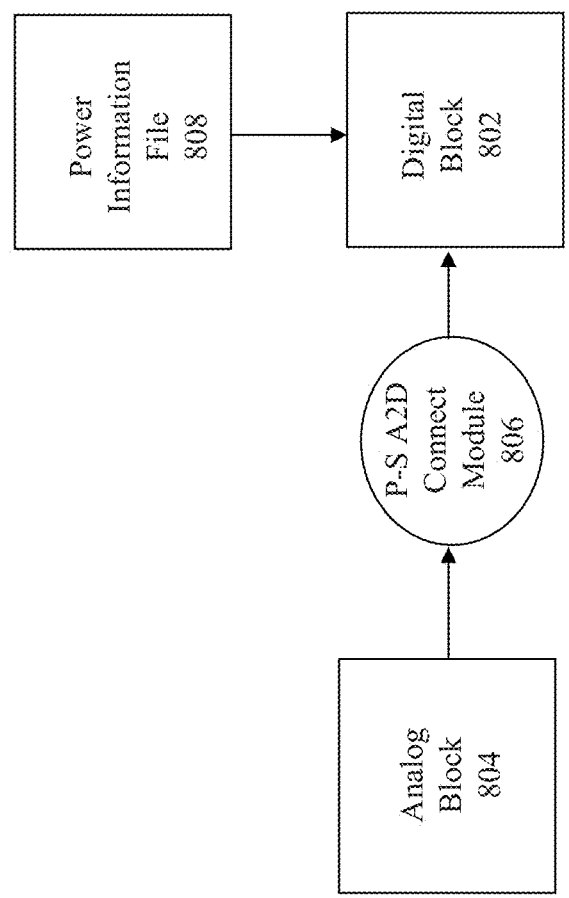
FIG. 8 illustrates insertion of a power aware A2D connect module.

FIG. 8 illustrates insertion of a power smart A2D connect module 806 into an electronic design. This example shows an analog block 804 that drives a power aware digital block 802. The digital block 802 is power aware since it is associated with a power information file 808 that specifies power-related details and functionality of the digital block 802.

The A2D power smart connect module operates by identifying the power-domains associated with the digital signals that are being driven by the A2D connect module. This is performed by tracing through the digital block to identify the power information files associated with the digital blocks.

Whenever there is a change in the analog signal, the VDD voltage value associated with the nominal conditions of the power-domains of digital signal is assessed. This VDD value can then be used to define the translation of analog voltage to digital 4-state value (1, 0, X or Z). For example, if the analog voltage is greater or equal to VDD, then it can be translated to digital 1'b1 value. The exact translation algorithm is fully programmable by the user by considering this VDD value.

The A2D power smart connect module is activated when there is a power-state change on the digital blocks it is driving even when there is no change in the analog signal. This is an important distinction from the conventional A2D connect module where the activity is triggered only when input analog signal changes and cross certain pre-determined thresholds.

The key point here is the ability of a A2D power smart connect module to sense the voltages associated with the power-domain of the digital block and use those to determine the A→1) value translation.

This document will now describe the selection and insertion of power smart connect modules according to some embodiments of the invention. According to some embodiments, the general semantics of an underlying design language are preserved for selection and insertion of power smart connect modules. For example, when using the Verilog-AMS language, the semantics of the Accellera Language Reference Manual (LRM) are preserved for selection and insertion of power smart connect modules.

One change from conventional approaches is to employ a new naming convention for identifying power smart connect modules. For instance, the names of power smart connect modules for CPF could be configured to include "_CPF" as a suffix. For example, "L2E_CPF" could be used as the name of a power smart digital-to-analog connect module.

When a digital block or net that is influenced by the power intent specified in power information file is connected directly or indirectly to an analog block or a net, a power smart connect module is inserted to perform power aware communication between the analog and digital blocks. When digital net drives an analog net, a D2A connect module is inserted using the Verilog-AMS Connect Module insertion semantic. When such digital net belongs to a digital block that directly or indirectly influenced by a power smart connect module is inserted.

To account for power smart connect modules, the Verilog-AMS connect rules are extended to allow for the presence of both ordinary as well as power smart connect modules for a given set of disciplines. The following is an illustration of this concept:

Connectrule lowPowerConnect;
 Connect input logic output electrical D2A;
 Connect input logic output electrical D2A_CPF;
endconnectrules;

It is noted that there are two different connect rules for the same set of disciplines and port direction in this example. "D2A" is an ordinary connect module and "D2A_CPF" is a power smart connect module. Therefore, when a power-influenced digital block (i.e. the one that has power semantics defined on it) drives an analog block, the "D2A_CPF" is used and "D2A" is otherwise used for interactions between non-power aware blocks.

With regard to power sensitivity of an AMS model, an AMS model, by definition, can contain both analog as well as digital parts and their interaction. Low-power formats are targeted for digital portions of the design. When power semantics are defined on an AMS model, some embodiments apply those semantics to the digital portions of the AMS model. For example, if an AMS model contains a digital register, it is corrupted to "1'bx" when the power domain defined on the scope in which the AMS model is instantiated with switched off. This is a feature that allows AMS model writers and designers to support writing and simulation power aware digital behavior in an AMS model.

With regard to power sensitivity of the power smart connect modules, the connect modules are special AMS models that contain both analog as well as digital behaviors. However, the connect modules are treated differently while considering the power impact of power aware techniques, such as CPF techniques. Although power smart connect modules are responsible for performing analog-digital value translation considering the impact of power-state of the digital blocks, the connect modules themselves are not sensitive to the power-state of the design scope in which they are instantiated.

To explain, consider the example of FIG. 9. As shown in this figure, a digital net b1 is connected to an analog net c1. A power smart connect module is inserted in the scope of block A. All the blocks A, B and C have switchable power domains. When Block A is shut off, the power smart connect module instantiated in Block A is not shut off and instead continues to operate normally. In other words, when Block B and Block C are on, the power aware digital to analog value translation continues to occur independent of the power-state of Block-A. Therefore, in the present embodiment, the functioning of the power smart connect modules is closely tied to the power-state of the digital block that drives it and not on the block that instantiates it.

Another aspect of embodiments of the invention relates to communications between two always-on power domains when analog ports are involved. When a signal is connected between two always-on power domains through a feed-through path, there are some considerations to be addressed for AMS simulation. When a digital driver is in an always-on power domain and drives an analog or an AMS block that is also in an always-on domain, then in some embodiments the approach ensures that the receiving analog net (i.e. the voltage on the analog net) does not get corrupted if its surrounding scopes are power-domain.

Figure 10A:
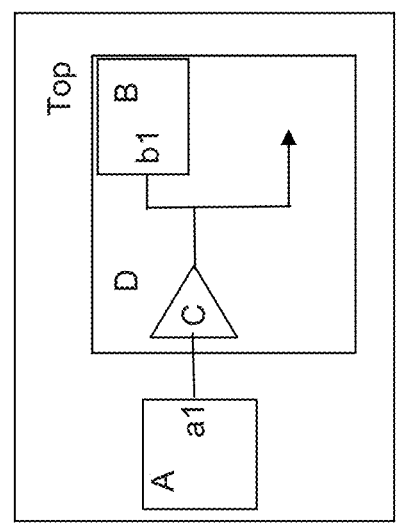

This is illustrated in FIG. 10A, in which block A and B are always ON, net a1 is digital and b1 is an analog port. The block C is a simple buffer. The path from a1 to b1 is a simple feed-through. The block D is switchable and can be powered-down.

Figure 10B:
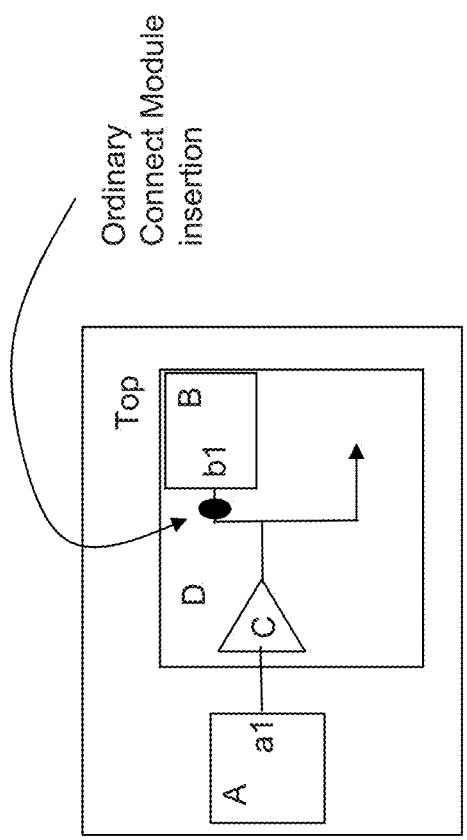
Figure 13:
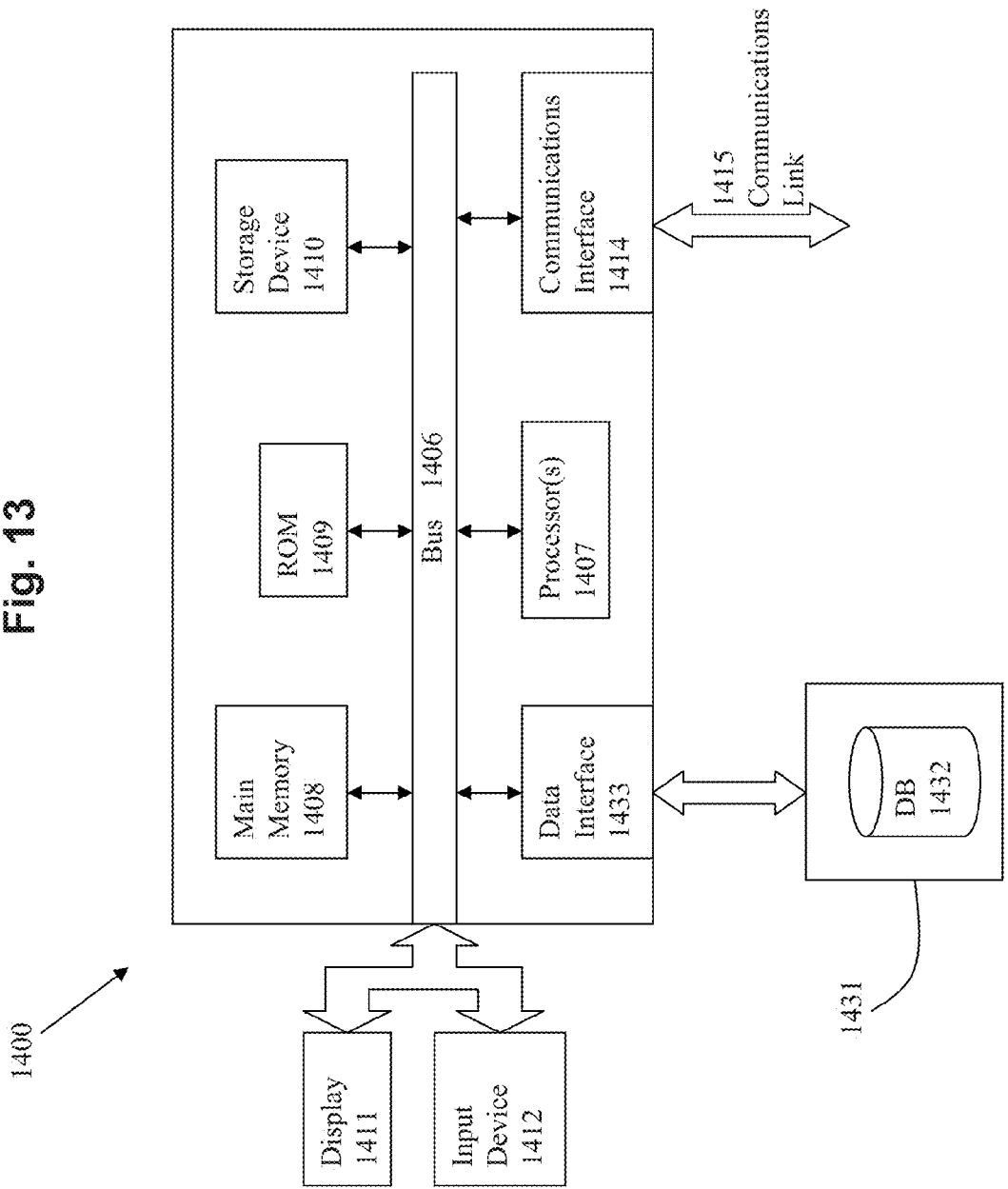
FIG. 13 illustrates an example computing architecture with which embodiments of the invention may be practiced.

As shown in FIG. 10B, in a traditional connect module insertion scheme, the connect module will be inserted at the input of block-B in the scope of block-D and driven by the output of buffer C. When the block-D is switched off, the buffer C is also switched off and this can feed in a corrupted (powered-down) digital signal to the D2A connect module resulting in block-B showing off powered-down analog voltage. This is an incorrect power simulation since a feed-through path between 2 always-on cannot be corrupted.

To address this, as shown in FIG. 10C, the driver of the power smart connect module is directly fed by the always-ON digital driver (as shown above). This insures that even when block-D is powered-down, the digital driver a1 is correctly translated to b1 through a power smart connect module.

The co-existence of power aware techniques and AMS partitioning will now be described. As previously discussed above, the low-power intent described in the power information file can lead to topological changes in the design by inserting the appropriate logic gates to insure power-techniques like isolation and state-retention are honored and simulated in a power aware simulation. Similarly, mixed-signal simulation may require topological changes by inserting connect modules to auto-partition the design into analog and digital blocks, and to also ensure proper communication between analog and digital blocks. According to some embodiments, the power related and AMS related topological changes are allowed to co-exist and work with each other.

With regard to D2A connect module and isolation cells, if a power aware digital block is driving an analog cell and also uses isolation cells at its output during power-shutoffs, then the connect module (D2A) is allowed to see the output of isolation cell. This ensures that the low-power controls using isolation cells are fully honored even in the presence of D2A connect modules.

FIG. 11 is an example of this situation. In this example, it is assumed that an isolation rule is specified on the power domain of block A. After power-logic insertion, an isolation cell is inserted between the digital block A and the analog block B. After AMS partitioning, a power smart connect module is inserted between the isolation cell and the analog block B.

With regard to A2D connect modules and isolation cells, if an analog block is driving digital block then an A2D connect module inserted. If the driven digital block has input isolation rules, the output of A2D block drives the input isolation cells. In this way, the isolation rule is honored during the simulation.

FIG. 12 is an example of this situation. In this example, it is assumed that an isolation rule is specified on the power domain of block B. After power-logic insertion, an isolation cell is inserted between the analog block A and the digital block B. After AMS partitioning, a power smart connect module is inserted between the analog block A and the isolation cell.

In the case where the A2D is driving a power aware digital block that does not have any input isolation rules, a special consideration is given to power-shut off situation. When a digital block is power-shutoff, its signals can be in the saved mode or corrupted (i.e. forced to X state). When such a powered down digital block is driven by an A2D power smart connect module, the output of the A2D is not allowed to be driven onto the powered down digital block. Therefore, the powered-down digital block is not allowed to be affected by the A2D connect module even when there is not an input isolation rule specified on the digital blocks. In this way, the semantics of signal corruption due to power shut-off are honored even in the presence of AMS connect modules.

With regard to bidirectional connect modules and isolation cells, the power information file is set up to allow the isolation cells to be specified only on the digital blocks. Therefore, the bidirectional connect modules will fall into one of the above cases.

System Architecture Overview

FIG. 9 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media, volatile media, and transmission media. Non-volatile media includes, for example, optical or magnetic disks, such as disk drive 1410. Volatile media includes dynamic memory, such as system memory 1408. Transmission media includes coaxial cables, copper wire, and fiber optics, including wires that comprise bus 1406. Transmission media can also take the form of acoustic, or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A computer implemented method using a computer processor for simulating a mixed signal electronic design, comprising:
    using at least the computer processor to perform a process, the process comprising:
    receiving the mixed signal electronic design for simulation, wherein
        the mixed signal electronic design is associated with power state information that includes a plurality of states of a power domain of at least a portion of the mixed signal electronic design;
    inserting a power aware interface element, which is made aware of information or data about power management for the mixed signal electronic design, between a digital design portion and an analog design portion based at least in part upon the power state information of a driving part or a driven part of the digital design portion and the analog design portion, rather than based on whether or not a net transitions between the digital design portion and the analog design portion, wherein
        the power aware interface element performs conversion of an electrical signal between a digital domain and an analog domain based at least in part upon the power state information; and
    using the power aware interface element to simulate the mixed signal electronic design.

2. The method of claim 1, in which the power state information is stored in a power information file in a file format that is used to specify the power-related information or data across multiple design phases involving multiple electronic design automation design tools.

3. The method of claim 1, in which the power aware interface element comprises a connect module.

4. The method of claim 1, in which the power aware interface element comprises a D2A interface element, and the D2A interface element back traces a digital net to collect a list of digital drivers and power domains.

5. The method of claim 4, in which the power aware interface element is triggered by a change in a driving digital signal or a change in a power domain state.

6. The method of claim 4, in which the power aware interface element couples multiple digital drivers from multiple power domains to the analog design portion, and in which driver selection for the list of digital drivers is based at least in part on ON or OFF states.

7. The method of claim 1, the process further comprising distinguishing between a signal corruption die due to power shutoff and power corruption due to a functional problem.

8. The method of claim 1, in which the power aware interface element comprises an A2D interface element, and the A2D interface element identifies one or more power domains being driven by the A2D interface element.

9. The method of claim 8, in which the A2D interface element assesses VDD voltage values associated with nominal conditions, which are specified or defined in the power state information, of the one or more power domains to define translation values for the electrical signal.

10. The method of claim 8, in which the A2D interface element is activated when there is a change in power state on the digital design portion that is being driven by the A2D interface element.

11. The method of claim 1, in which the power aware interface element instantiated in a given block is not shut off when the given block is shut off, if the digital design portion associated with the power aware interface element is not shut off.

12. The method of claim 1, wherein the electrical signal between a digital driver and an analog receiver are both always on, and the power aware interface element is directly fed by the always on digital driver.

13. The method of claim 1, in which the power aware interface element is inserted with consideration of an isolation cell between the digital design portion and the analog design portion.

14. A system for simulating a mixed signal electronic design, comprising:
   a processor;
   a memory for holding programmable code that includes instructions which, when executed by the processor, cause the processor to:
   receive the mixed signal electronic design for simulation, wherein
      the mixed signal electronic design is associated with power state information that includes a plurality of states of a power domain of at least a portion of the mixed signal electronic design;
   insert a power aware interface element, which is made aware of information or data about power management for the mixed signal electronic design, between a digital design portion and an analog design portion based at least in part upon the power state information of a driving part or a driven part of the digital design portion and the analog design portion, rather than based on whether or not a net transitions between the digital design portion and the analog design portion, wherein
      the power aware interface element performs conversion of an electrical signal between a digital domain and an analog domain based at least in part upon the power state information; and
   use the power aware interface element to simulate the mixed signal electronic design.

15. The system of claim 14, in which the power state information is stored in a power information file in a file format that is used to specify power-related information across multiple design phases involving multiple electronic design automation design tools.

16. The system of claim 14, in which the power aware interface element comprises a connect module.

17. The system of claim 14, in which the power aware interface element comprises a D2A interface element, and the D2A interface element back traces a digital net to collect a list of digital drivers and power domains.

18. The system of claim 14, wherein the programmable code further comprises instructions which, when executed by the processor, further cause the processor to distinguish between a signal corruption die due to power shutoff and power corruption due to a functional problem.

19. The system of claim 14, in which the power aware interface element comprises an A2D interface element, and the A2D interface element identifies one or more power domains being driven by the A2D interface element.

20. The system of claim 14, wherein the electrical signal between a digital driver and an analog receiver are both always on, and the power aware interface element is directly fed by the always on digital driver.

21. The system of claim 14, in which the power aware interface element is inserted with consideration of an isolation cell between the digital design portion and the analog design portion.

22. A computer program product that includes a non-transitory computer readable medium, the non-transitory computer readable medium comprising a plurality of computer instructions which, when executed by a computer processor, cause the processor to execute a process for simulating a mixed signal electronic design, the process comprising:
   receiving the mixed signal electronic design for simulation, wherein the mixed signal electronic design is associated with power state information that includes a plurality of states of a power domain of at least a portion of the mixed signal electronic design;
   inserting a power aware interface element, which is made aware of information or data about power management for the mixed signal electronic design, between a digital design portion and an analog design portion based at least in part upon the power state information of a driving part or a driven part of the digital design portion and the analog design portion, rather than based on whether or not a net transitions between the digital design portion and the analog design portion, wherein
      the power aware interface element performs conversion of an electrical signal between a digital domain and an analog domain based at least in part upon the power state information; and
   using the power aware interface element to simulate the mixed signal electronic design.

23. The computer program product of claim 22, in which the power state information is stored in a power information file in a file format that is used to specify power-related information across multiple design phases involving multiple electronic design automation design tools.

24. The computer program product of claim 22, in which the power aware interface element comprises a connect module.

25. The computer program product of claim 22, in which the power aware interface element comprises a D2A interface element, and the D2A interface element back traces a digital net to collect a list of digital drivers and power domains.

26. The computer program product of claim 22, the process further comprising distinguishing between a signal corruption die due to power shutoff and power corruption due to a functional problem.

27. The computer program product of claim 22, in which the power aware interface element comprises an A2D interface element, and the A2D interface element identifies one or more power domains being driven by the A2D interface element.

28. The computer program product of claim 22, wherein the electrical signal between a digital driver and an analog receiver are both always on, and the power aware interface element is directly fed by the always on digital driver.

29. The computer program product of claim 22, in which the power aware interface element is inserted with consideration of an isolation cell between the digital design portion and the analog design portion.

* * * * *